(12) United States Patent
Bush et al.

(10) Patent No.: US 12,017,393 B2
(45) Date of Patent: Jun. 25, 2024

(54) METHODS FOR MAKING FLEXIBLE CONTAINERS AND ASSOCIATED PRODUCTS

(71) Applicant: Technimark LLC, Asheboro, NC (US)

(72) Inventors: Joshua Robert Bush, High Point, NC (US); Joshua Miles Glessner, High Point, NC (US); Ralph John Nolan, Asheboro, NC (US); Keri Michelle Strickland, Asheboro, NC (US)

(73) Assignee: Technimark LLC, Asheboro, NC (US)

( * ) Notice: Subject to any disclaimer, the term of this patent is extended or adjusted under 35 U.S.C. 154(b) by 199 days.

(21) Appl. No.: 17/473,942

(22) Filed: Sep. 13, 2021

(65) Prior Publication Data

US 2021/0402662 A1 Dec. 30, 2021

Related U.S. Application Data

(63) Continuation of application No. 16/160,480, filed on Oct. 15, 2018, now Pat. No. 11,267,176, which is a
(Continued)

(51) Int. Cl.
*B29C 45/64* (2006.01)
*B29C 45/00* (2006.01)
(Continued)

(52) U.S. Cl.
CPC .......... *B29C 45/64* (2013.01); *B29C 45/0001* (2013.01); *B29C 45/0025* (2013.01);
(Continued)

(58) Field of Classification Search
CPC ............ B65D 33/02; B65D 21/0233; B65D 21/0208; C09J 7/21; C09J 7/32;
(Continued)

(56) References Cited

U.S. PATENT DOCUMENTS 10,150,237 B2   12/2018   Bush et al.

FOREIGN PATENT DOCUMENTS

DE   102006015767 A1   10/2007
JP       60124218 A    7/1985
(Continued)

OTHER PUBLICATIONS

Notice of Allowance and Allowability issued by the United States Patent Office for U.S. Appl. No. 16/160,180, dated Nov. 1, 2021.

*Primary Examiner* — Robert J Hicks
(74) *Attorney, Agent, or Firm* — Bradley Arant Boult Cummings LLP; Henry B. Ward, III

(57) ABSTRACT

Presented is a method for making a flexible container. The method implements an injection mold having a collapsible core that expands/moves to define the apertures and, in some embodiments, holds a flexible film in place during the injection mold process and collapses/moves back post-injection molding to allow for the flexible container to be readily removed from the die. In addition, the method described includes a post-injection molding anneal process that is implemented to allow the flexible film to shrink so as to provide for the form-fitting of the film to the molded portion of the container.

14 Claims, 4 Drawing Sheets

Related U.S. Application Data continuation of application No. 14/966,936, filed on Dec. 11, 2015, now Pat. No. 10,150,237.

(60) Provisional application No. 62/091,283, filed on Dec. 12, 2014.

(51) Int. Cl.
*B29C 45/14* (2006.01)
*B29C 45/40* (2006.01)
*B29D 22/00* (2006.01)
B29K 23/00 (2006.01)
B29K 623/00 (2006.01)
B29L 31/00 (2006.01)
B65D 37/00 (2006.01)
B65D 39/00 (2006.01)

(52) U.S. Cl.
CPC .. *B29C 45/14008* (2013.01); *B29C 45/14065* (2013.01); *B29C 45/40* (2013.01); *B29D 22/003* (2013.01); *B29K 2023/06* (2013.01); *B29K 2023/12* (2013.01); *B29K 2623/12* (2013.01); *B29K 2995/0049* (2013.01); *B29L 2031/7162* (2013.01); *B65D 37/00* (2013.01); *B65D 39/0052* (2013.01)

(58) Field of Classification Search
CPC ............ C09J 2301/16; C09J 2301/306; B29D 22/003; B29C 45/0001; B29C 45/14008; B29C 45/14065; B29C 45/40; B29C 45/0025; B29C 45/64
USPC ........... 220/9.1, 9.4, 23.86, 23.83, 919, 918; 156/85, 84, 60
See application file for complete search history.

(56) References Cited

FOREIGN PATENT DOCUMENTS

| | | | |
|---|---|---|---|
| JP | 1177698 A | 3/1999 | |
| JP | 3720562 B2 * | 11/2005 | |
| WO | WO-9617727 A1 * | 6/1996 | ........... B29C 51/162 |

\* cited by examiner

METHODS FOR MAKING FLEXIBLE CONTAINERS AND ASSOCIATED PRODUCTS

CROSS-REFERENCE TO PRIORITY APPLICATION

This application is a continuation of U.S. patent application Ser. No. 16/160,480 filed on Oct. 15, 2018, which is a continuation of U.S. patent application Ser. No. 14/966,936 filed on Dec. 11, 2015, which itself claims the benefit of U.S. Provisional Patent Application No. 62/091,283 filed on Dec. 12, 2014. The entirety of each patent application is hereby incorporated by reference in their entirety.

FIELD

The proposed invention is a method for making flexible containers having a molded portion and a flexible film portion and products resulting from the method.

BACKGROUND

Typically, consumer packaging, for household products, such as laundry detergent or the like, takes on the form of cardboard cartons, flexible bags and/or molded containers (e.g. tubs, buckets or the like).

Traditional molded containers are formed by an injection molding process from a polymeric/plastic material, such as polypropylene, polyethylene or the like. However, due to the amount of plastic material required, such molded containers tend to be heavier in weight and/or costlier to produce than other packaging options.

Recently, flexible containers have been introduced that include both a molded portion and a flexible portion. The flexible portion, typically a laminate film or the like, replaces an area of the container that would otherwise be formed of the molded plastic material. The flexible film portion is applied during the injection molding process and results in a container having significantly reduced weight. Additionally, the flexible portion is typically configured to include a printed label that includes graphics, such as product logo, product information and the like, thus, eliminating the need to apply a separate label to the container after the injection molding process; thereby reducing handling and secondary operations.

However, when such flexible film portions are applied during the injection molding process, problems have been apparent. The molded (i.e., crystalline plastic) portion tends to shrink in size as it cools during the injection molding process, while the laminate films used for the flexible portion do not experience the same shrinking phenomena. As a result, in many desired configurations of the flexible container, the flexible portion will appear loose or oversized as a result of being applied during the injection molding process.

Moreover, problems result from the configuration of injection molds required to form a molded portion having an aperture over which the flexible film portion is applied. In this regard, the portion of the mold that forms the aperture in the molded portion results in difficulty with being able to remove the flexible container from the mold (i.e., the flexible portion tends to stick to the core of the male die).

Therefore, a need exists to improve upon the method for making flexible containers. The desired method should result in a flexible container in which the flexible portion is form-fitted to the molded portion (i.e., the flexible portion does not appear oversized or loosely fit about the molded portion). In addition, the desired method should provide for the flexible containers to be readily removed from the injection molds, so as to eliminate problems associated with the flexible container sticking to the mold core post-injection mold.

BRIEF SUMMARY

The object of the proposed new art is to provide a method for making a flexible container comprising an injection molded part with at least one aperture and at least one flexible film that is affixed to the boundaries of the aperture (s) so as to define a container. The method includes a die having a collapsible core (i.e., a movable portion of the male die) that expands/moves to hold the film in place prior to injecting the container material and collapses/moves back post-curing of the container material to allow for the flexible container to be readily removed from the die. In addition, the method includes a post-injection molding anneal process that is implemented to allow the flexible film to shrink so as to provide for form-fitting of the film to the molded portion of the container.

Specific embodiments of the invention are defined by a method for making a flexible container. The method includes providing for an injection mold comprising a male die having a central axis and a corresponding female die and inserting the male die into the female die. The insertion of the male die into the female die defines a space there between. The method further includes moving or otherwise expanding a moveable portion of the male die away from the central axis to thereby reduce a volume of the space. Further, the method includes injecting a container material in the space and curing the container material to create a molded part having at least one aperture. In addition, the method includes moving or otherwise collapsing the movable portion of the male die towards the central axis to thereby increase the volume of space, withdrawing the male die from the female die and removing the container from the injection mold. Additionally, the method includes adhering at least one film to the molded part along a perimeter of the one or more apertures. Lastly, the method includes annealing the container at a predetermined temperature and for a predetermined dwell time to thereby shrink the film to form-fit the container.

In specific embodiments of the invention adhering the film to the molded part along a perimeter of the apertures is accomplished by disposing the film in the female die prior to inserting the male die into the female die, such that the curing of the container material additionally provides for adhering the film to the molded part along a perimeter of the apertures. In such embodiments of the method, moving the movable part of the male die away from the central axis further serve to hold the film in place during the injection and cure process. In related embodiments of the method, disposing the film in the female die further includes providing for the film comprised of a layered laminate of polypropylene, wherein a back layer of the film comprises a temperature-sensitive polymer that adheres to the container material during the curing of the container material.

In specific embodiments of the method the film that is adhered to the molded part has a predetermined axial grain orientation to thereby affect shrinkage in a desired axial direction during annealing. In such embodiments of the method, the grain orientation is orientation may be predetermined based one or more of (1) a type of film used, and/or (2) a geometry of the container and/or the at least one aperture.

In other specific embodiments of the method injecting a container material in the space there between further includes injecting the container material in the space, wherein the container material is one of polypropylene or polyethylene. Additionally, in further embodiments of the method curing the container material further comprises curing the container material at a predetermined temperature in a range of 300 to 525 degrees Fahrenheit.

Moreover, in other specific embodiments of the method moving the movable portion of the male die away from the central axis, further includes closing the injection mold to affect mechanical movement of the movable portion of the male die away from the central axis and moving the movable portion of the male die towards the central axis, further includes opening the injection mold to affect mechanical movement of the movable portion of the male die towards the central axis.

In additional embodiments of the method, annealing the container at a predetermined temperature and for a predetermined dwell time further includes selecting the predetermined temperature and the predetermined dwell time based on at least one of (1) a size of the container, and (2) a thickness of the film.

Another method for making a flexible container defines other embodiments of the invention. The method includes providing for an injection mold including a male die having a central axis and a corresponding female die and disposing a film in the female die. The method further includes inserting the male die into the female die to thereby define a space between the male die and the female die and moving a movable portion of the male die away from the central axis to thereby reduce a volume of the space and hold the film in place. In addition, the method includes injecting a container material in the space to create a container having at least one aperture and curing the container material, such that curing the container material provides for adhering the film to the container material over the at least one aperture. Additionally, the method includes moving the movable portion of the male die towards the central axis to thereby increase the volume of the space, withdrawing the male die from the female die and removing the container from the male die. Further, the method includes subsequently annealing the container at a predetermined temperature and for a predetermined dwell time to thereby shrink the film to form-fit the container.

Still further embodiments of the invention are defined by a method for making a molded part. The method includes providing for an injection mold including a male die having a central axis and a corresponding female die and inserting the male die into the female die to define a space between the male die and the female die. The method further includes moving a movable portion of the male die away from the central axis to thereby reduce a volume of the space, injecting a container material in the space and curing the container material to create a molded part having at least one aperture. The moving of the movable of the male die away from central axis defines the at least one aperture. Additionally, the method includes moving the movable portion of the male die towards the central axis to thereby increase the volume of the space, withdrawing the male die from the female die, and removing the molded part from the injection mold. The moving of the movable portion of the male die towards the central axis assists in removing the molded part from the injection mold.

The above description provides exemplary applications. While there are countless other applications and types of methods for making the flexible container.

BRIEF DESCRIPTION OF THE DRAWINGS

Reference will now be made to the accompanying drawings, where.

DETAILED DESCRIPTION OF EMBODIMENTS OF THE INVENTION

Described below in detail are methods for making a flexible container that includes an injection molded part with at least one aperture and at least one flexible film that is affixed to the boundaries of the aperture(s) so as to define a container, in accordance with embodiments of the present invention. In addition to the methods herein described, embodiments of the invention include products (i.e., flexible containers) resulting from the method described.

The methods herein described implement an injection mold having a collapsible core that expands/moves to define the apertures and, in some embodiments, hold the flexible film in place during the injection mold process and collapses/moves back post-injection molding process to allow for the flexible container to be readily removed from the die.

In addition, the method includes a post-injection molding anneal process that is implemented to allow the flexible film to shrink so as to provide for form-fitting of the film to the molded portion of the container. As previously discussed, curing the molded portion of the flexible container during the injection molding process results in a degree of shrinkage to the molded portion, however; the curing does not impart shrinkage in the flexible film. As a result, the flexible film is less than form fitted to the molded portion (i.e., the flexible film is loosely fitted to the molded portion resulting in a "wrinkly" or "puffy" appearance). The post-injection molding anneal process alleviates this problem by shrinking the flexible film, resulting in greater form-fitting of the flexible film to the molded portion of the container.

Figure 1:
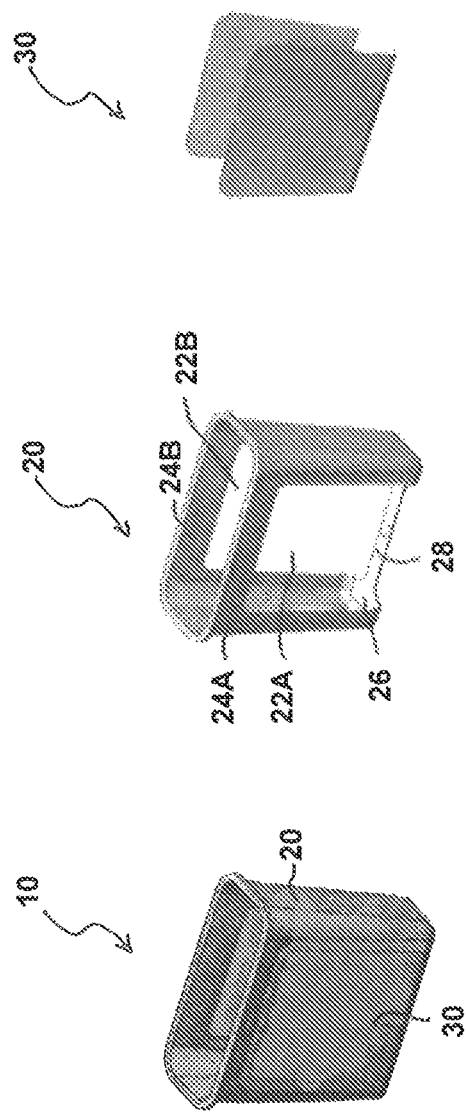
FIG. 1 provides schematic diagrams of one example of a molded part, a flexible film (e.g., pre-cut label) and flexible container comprised of the molded part and flexible film, in accordance with embodiments of the present invention.

Referring to FIG. 1 shown are schematic diagrams of one example of a flexible container 10 formed of a molded part 20 and a flexible film 30. The flexible container 10 serves to replace areas that would otherwise be formed of molded material with the flexible film, thereby reducing the weight of the flexible container 10. Additionally, in specific embodiments of the invention, in which the flexible film 30 is applied during the injection molding process and takes the form of pre-cut and/or pre-printed product labels (including product name, logos, graphics, product information and the like), the need for post-injection molding handling and processing of the container (e.g., applying a separate label to the container or the like) is lessened or eliminated.

In the illustrated example of FIG. 1 the molded part 20, which may comprise polypropylene, polyethylene or the like, includes two apertures 22A and 22B, otherwise referred to as opening or holes, which serve as the areas that would otherwise be formed of molded material and over which the flexible film 30 is applied. In the illustrated example, a first aperture 22A is formed in a first side portion 24A and a bottom portion 26 of the container and a second aperture 22B is formed in a second side portion 24B (opposite to the first side portion 26A) and the bottom portion 26. The first aperture 22A and the second aperture 22B being separated in the bottom portion 26 by a bottom molded portion 28, which is configured as an I-beam-like separating member. It should be noted that other embodiments of the molded part may include more or less apertures based on such features as the geometric configuration of the flexible container, the desired rigidity of the flexible container and the like.

Further, in the illustrated example of FIG. 1 the flexible film 30, which may comprise a layered laminate of polypropylene or the like, is a single flexible film that is affixed to the perimeter of the apertures 22A and 22B and overlays and is affixed to the bottom molded portion 28. As will be discussed in detail infra., in specific embodiments of the method of making the flexible container 10 the flexible film 30 is affixed to the molded part 20 during the injection molding process, such that, a back layer of the laminate flexible film comprises a temperature-sensitive polymer that adheres to the molded part during the curing of the molded material. It should be noted that in other embodiments of the invention more than one flexible film may be implemented to form the flexible container based on such features as the size and location of the apertures, the geometric configuration of the flexible container, the desired rigidity of the flexible container and the like. Additionally, it should be noted that while embodiments of the invention herein described provide for the flexible film to be affixed to the molded part during the injection molding process, in other embodiments of the invention, the flexible film may be affixed to the molded part after completion of the injection molding process (i.e., once the molded part has been removed from the mold).

Figure 2:
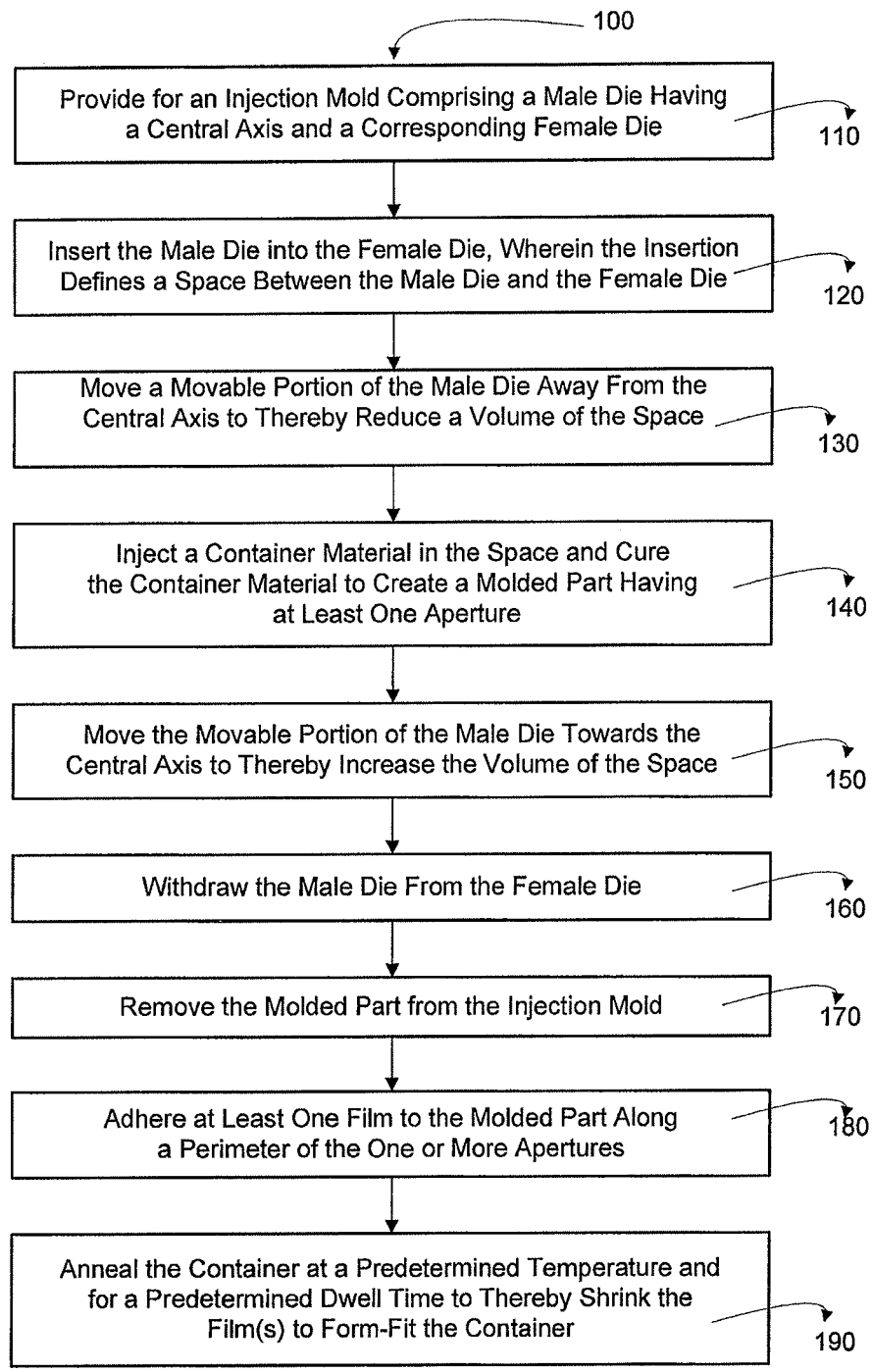
FIG. 2 is a flow diagram of a method for making a flexible container, in accordance with embodiments of the present invention.

Referring to FIG. 2 a flow diagram is present of a method 100 for making a flexible container, in accordance with embodiments of the present invention. The method herein described can, in some embodiments, be performed by a programmable machine operating under computer processor control.

At Event 110, an injection mold that includes a male die having a central axis and a corresponding female die is provided. An exemplary male die is shown and described in FIGS. 3 and 4, infra. At Event 120, the male die is inserted into the female die, such that the insertion process defines a space between the male die and female die. The space between the male and female dies is the area that is subsequently injected with the container material to create the molded part.

At Event 130, a movable portion, otherwise referred to as the core, of the male die is moved, or otherwise expands, away from the central axis to thereby reduce a volume of the space. In specific embodiments of the method, movement of the movable portion of the male die serves to reduce the volume of the space such that one or more apertures (i.e., openings or holes) are created in the molded part. In specific embodiments of the method, moving the movable portion of the male die is accomplished by closing the injection mold to affect mechanical movement of the movable portion of the male die away from the central axis. In other embodiments of the invention, other means of affecting movement of the movable portion, such as pneumatics, hydraulics, or the like, may be implemented.

At Event 140, container material is injected in the space and the container material is cured to create a molded part having at least one aperture. In specific embodiments of the method, the container material may comprise polypropylene, polyethylene or any other suitable polymeric material used in injection molding processing. In other specific embodiments of the method, the molded part is cured at a predetermined temperature in the range of about 300 degrees Fahrenheit to about 525 degrees Fahrenheit. In specific embodiments of the method, the resulting molded part has two apertures; a first aperture opening along both a first side portion and the bottom portion of the molded part and a second aperture opening along a second side portion (which is opposite the first side portion) and the bottom portion of the molded part. The molded part (20) shown and described in FIG. 1 provides for such an exemplary molded part, however, it should be noted that other molded parts having different configurations, different number of apertures and different aperture configuration are also possible and within the inventive concepts herein disclosed.

At Event 150, the movable portion of the male die is moved, or otherwise collapses, towards the central axis to thereby increase the volume of the space. In specific embodiments of the method, moving the movable portion of the male die towards the central axis is accomplished by opening the injection mold to affect mechanical movement of the movable part. As previously noted, in other embodiments of the invention, other means of affecting movement of the movable portion, such as pneumatics, hydraulics or the like, may be implemented.

At Event 160, the male die is withdrawn from the female die and, at Event 170, the molded part is removed from the injection mold. It should be noted that implementation of the movable portion of the male die, in which the movable portion is moved, or otherwise collapses toward the central axis after completion of the injection mold process serves to alleviate reliability problems associated with removing the molded part from the injection mold.

At Event 180, at least one film is adhered to the molded part along the perimeter of the one or more apertures. In specific embodiments of the method, the film(s) are adhered to the molded part during the injection molding process. In such embodiments of the method, the film(s) are disposed in the female die prior to inserting the male die into the female die and the curing of the container material results in the adherence of the films to the molded part over the one or apertures (i.e., along the perimeter of the one or more apertures). Further, in such embodiments of the method, movement of the movable portion away from the central axis serves to hold the films in place during the injection of the container material and subsequent curing of the container material. In specific related embodiments, the films comprise a multi-layered laminate of polypropylene or the like, in which the back layer (i.e., the inner layer that is not in contact with the female die) comprises a temperature-sensitive polymeric material that melts and adheres to the molded part in response to curing temperatures.

At Event 190, the flexible container is annealed at a predetermined temperature and for a predetermined dwell time to thereby shrink the film to form-fit the molded part of the flexible container. In specific embodiments of the method, the predetermined temperature and dwell time are selected based on one or more of (1) the geometry/size of the flexible container, (2) the thickness and/or width/length of the film and (3) the amount of shrinkage desired.

Additionally, according to specific embodiments of the method, the film that is configured to be adhered to the molded part with a predetermined axial grain orientation. Grain orientation of the film is important to thereby affect shrinkage in the desired direction during annealing. For example, in the example shown in FIG. 1, in which the film extends lengthwise along two opposite sides of the container, shrinkage is desired in a lengthwise direction of the films and, as such, the grains of the film should also be oriented in the same lengthwise direction. In another example, in which films are configured on the flexible container such that uniform shrinkage is desired across the entire the film(s), the grains of the film should be axial oriented diagonally (i.e., cross-wise) to accommodate for uniform shrinkage in all directions. As such, in those embodiments in which the film is disposed in the female die prior to insertion of the male die into the female die, the film is required to be properly aligned in the female die to assure the desired axial grain orientation of the film. Moreover, in those embodiments in which the film includes a product label, the label printing and/or label cutting process is required to properly align the films so that the label appears on the film with the desired axial grain orientation.

Figure 3:
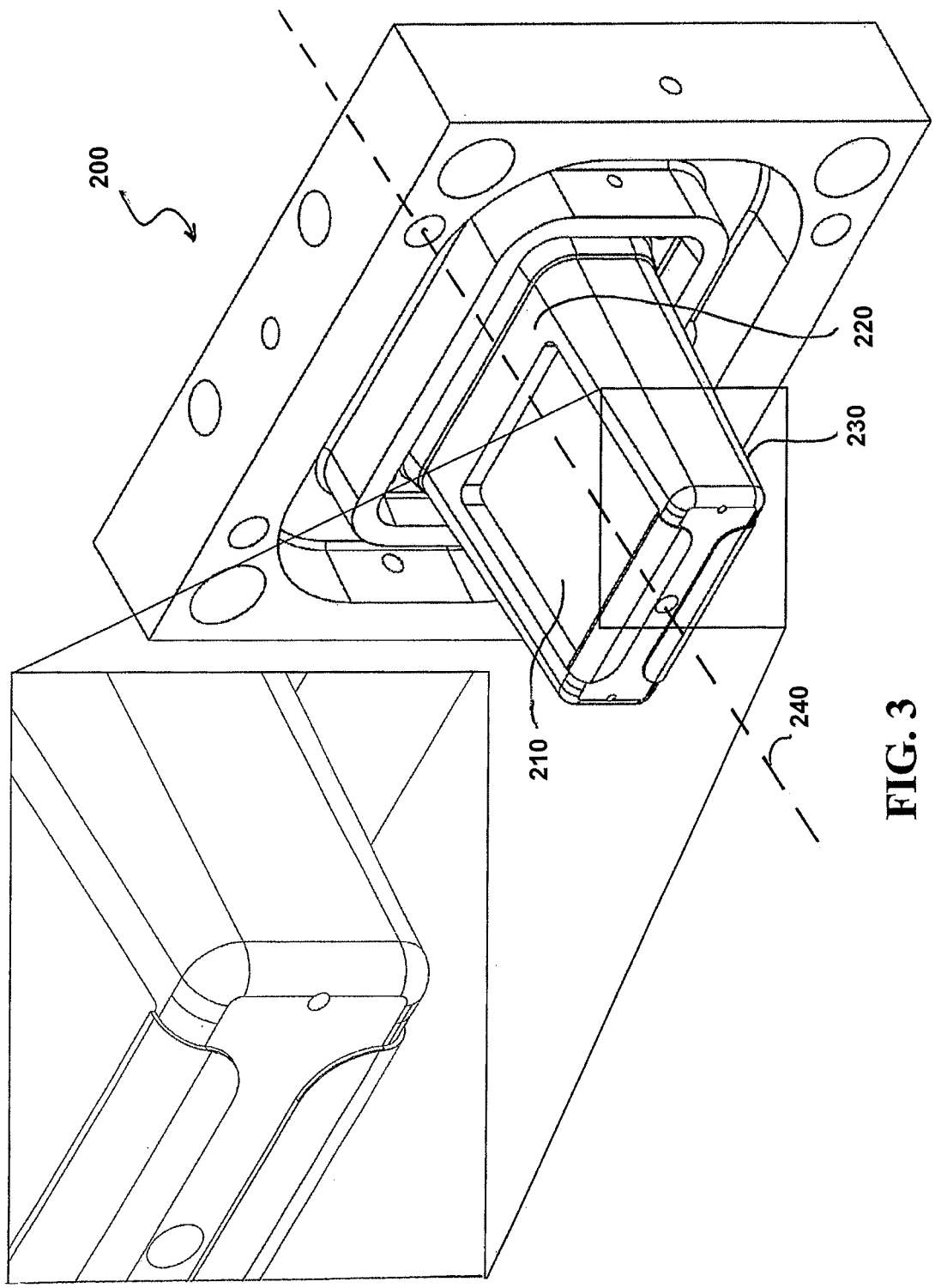
FIGS. 3 and 4 provide a perspective view of one example of the male die of an injection mold highlighting the collapsible core, in accordance with embodiments of the present invention.
Figure 4:
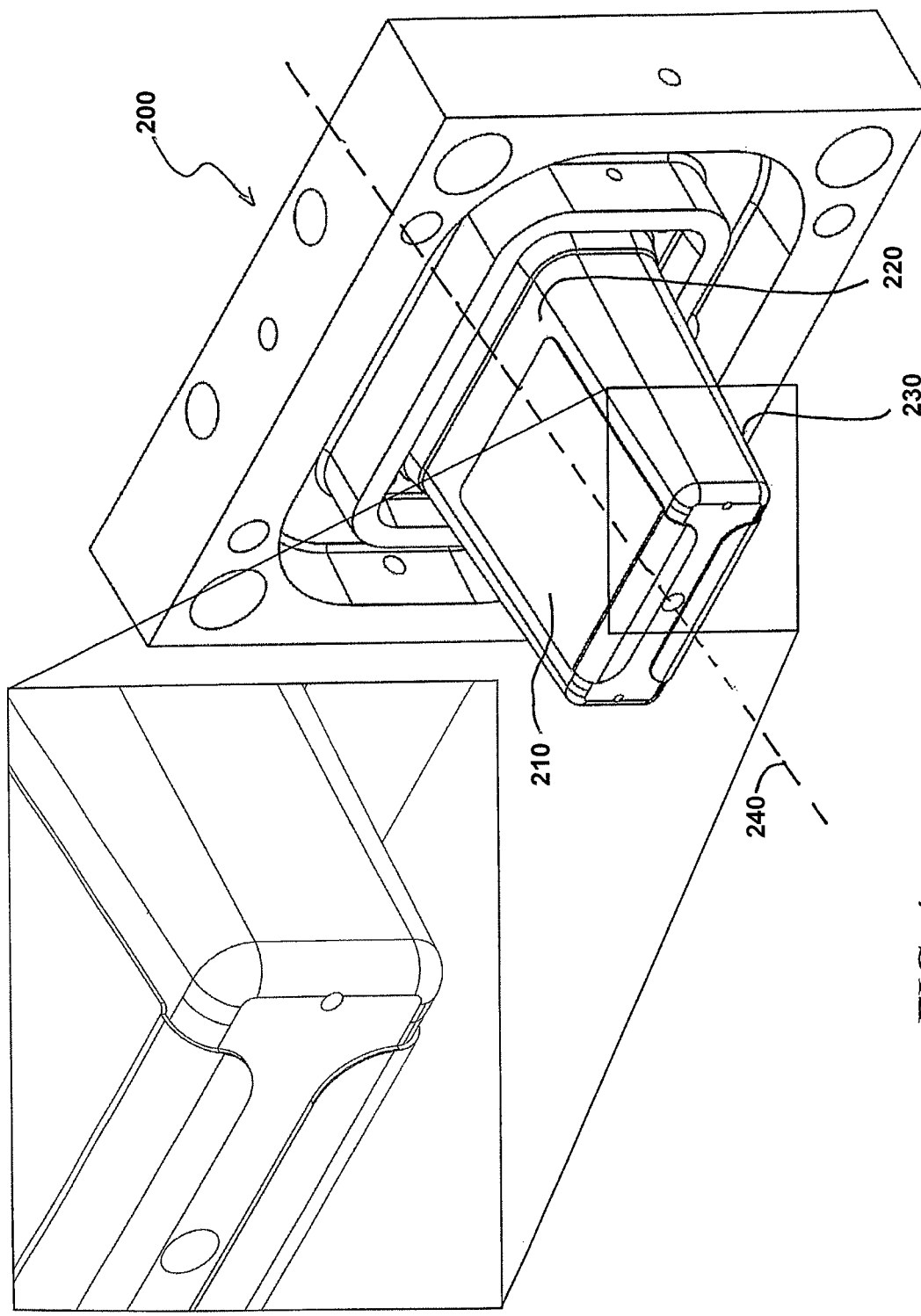

Referring to FIGS. 3 and 4, shown are perspective views of an exemplary male die 200 of an injection mold that is implemented in various embodiments of the present invention. Specifically, the male die 200 may be used in a method for making the flexible container shown in FIG. 1. FIG. 3 illustrates the male die 200 having a movable portion 210 in a collapsed state and FIG. 4 illustrates the male die having a movable portion 210 in the expanded state. In the illustrated embodiments of FIGS. 3 and 4 the moveable portion 210 is a plate that forms an expandable/collapsible core of the male die 200. It should be noted that while FIGS. 3 and 4 show the movable portion 210 present on the top facing 220 of the male die, in practice the movable portion 210 is also present in the bottom facing 230 of the male die, as well. In specific embodiments, separate movable portions (e.g., plates or the like) are provided in both the top facing 220 and the bottom facing 230 of the male die to accommodate movement in both directions.

The collapsed state of the movable portion shown in FIG. 3 exists prior to and after completion of the injection molding and curing operations. In specific embodiments of the invention, movement of the movable portion 210 away from the central axis 240 of the male die 210 occurs in conjunction with the closing the injection mold and results in the expanded state of the moveable portion shown in FIG. 4. In the expanded state the movable portion 210 serves to decrease the volume of space between the male die 200 and a corresponding female die (not shown in FIGS. 3 and 4). The decreased volume of space results in aperture(s) being formed in the molded part. Additionally, in those embodiments of the invention in which the film is adhered to the molded part during the injection molding process, the expanded state of the movable portion 210 provides for holding the film in place during the injection molding and curing processes.

Once the injection molding and curing processes are completed, the movable portion 210 of the male die 200 moves toward the central axis 240 resulting in the collapsed state shown in FIG. 3. In specific embodiments of the invention, the movement of the movable portion 210 toward the central axis 240 occurs in conjunction with the opening of the injection mold and results in the collapsible state shown in FIG. 3. As previously discussed, in the collapsed state the flexible container is more readily removable from the injection mold.

Thus, as described in detail above, present embodiments of the invention provide for methods of making flexible containers that implement an injection mold having a collapsible core that expands/moves to define the apertures and, in some embodiments, hold the flexible film in place during the injection mold process and collapses/moves back post-injection molding process to allow for the flexible container to be readily removed from the die. In addition, the method includes a post-injection molding anneal process that is implemented to allow the flexible film to shrink so as to provide for form-fitting of the film to the molded portion of the container.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, a mobile device such as a mobile phone, a computer program product, and/or the like), as a method (including, for example, a computer-implemented process, and/or the like), or as any combination of the foregoing. Accordingly, embodiments of the present invention may take the form of an entirely method embodiment, an entirely software embodiment (including firmware, resident software, micro-code, stored procedures in a database, or the like), an entirely hardware embodiment, or an embodiment combining software and hardware aspects that may generally be referred to herein as an apparatus or as a system. Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

The various methods described herein may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions described herein.

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions described herein.

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps described herein. Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A flexible container, the flexible container comprising:
a molded part having at least one aperture, wherein the molded part is formed within an injection mold comprising a male die having a central axis and a corresponding female die, wherein (i) the male die is inserted into the female die to define a space between the male die and the female die, (ii) a moveable portion of the male die is moved away from the central axis to thereby reduce a volume of the space, (iii) a container material is injected in the space, and (iv) the container material is cured to create the molded part; and
at least one film adhered to the molded part along a perimeter of the at least one aperture, wherein the molded part and the at least one film are annealed at a predetermined temperature and for a predetermined dwell time to shrink the at least one film to form-fit the flexible container.

2. The flexible container of claim 1, wherein, in response to curing the container material, (v) the movable portion of the male die is moved towards the central axis to thereby increase the volume of space, (vi) the male die is withdrawn from the female die, and (vii) the molded part is removed from the injection mold.

3. The flexible container of claim 1, the least one film is adhered to the molded part by disposing the film in the female die prior to inserting the male die into the female die and wherein the container material is cured to adhere the film to the molded part along the perimeter of the at least one aperture.

4. The flexible container of claim 2, wherein the movable portion of the male die is moved away from the central axis to thereby further hold the film in place.

5. The flexible container of claim 2, wherein the at least one film further comprises a layered laminate polypropylene.

6. The flexible container of claim 5, wherein the layered laminate polypropylene includes a back layer comprising a temperature-sensitive polymer that adheres to the container material during the curing of the container material.

7. The flexible container of claim 1, the at least one film is configured with a predetermined axial grain orientation to thereby affect shrinkage in a desired axial direction during annealing.

8. The flexible container of claim 7, wherein the predetermined axial grain orientation is predetermined based on at least one of (1) a film used, and (2) a geometry of the flexible container or the at least one aperture.

9. The flexible container of claim 1, wherein the container material is one of polypropylene or polyethylene.

10. The flexible container of claim 1, wherein the container material is cured at a predetermined temperature in a range of 300 to 525 degrees Fahrenheit.

11. The flexible container of claim 1, wherein the movable portion of the male die is moved away from the central axis by closing the injection mold to affect mechanical movement of the movable portion of the male die away from the central axis.

12. The flexible container of claim 2, wherein the movable portion of the male die is moved towards the central axis by opening the injection mold to affect mechanical movement of the movable portion of the male die towards the central axis.

13. The flexible container of claim 1, wherein the molded part and the at least one film are annealed at a predetermined temperature and for a predetermined dwell time, wherein the temperature and the dwell time are selected based on at least one of (1) a size of the container, and (2) a thickness of the film.

14. The flexible container of claim 1, wherein the molded part includes a first aperture opening in a first side portion and a bottom portion of the flexible container and a second aperture opening in a second side portion and the bottom portion, wherein the first side portion is opposite the second side portion.

* * * * *